(12) United States Patent
Busenitz et al.

(10) Patent No.: US 11,353,383 B2
(45) Date of Patent: Jun. 7, 2022

(54) SHOCK TEST ASSEMBLY

(71) Applicant: Honeywell Federal Manufacturing & Technologies, LLC, Kansas City, MO (US)

(72) Inventors: Clark Busenitz, Overland Park, KS (US); Weston A. McGuire, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 187 days.

(21) Appl. No.: 16/774,354

(22) Filed: Jan. 28, 2020

(65) Prior Publication Data

US 2021/0231544 A1   Jul. 29, 2021

(51) Int. Cl.
  *G01N 3/04*    (2006.01)
  *G01N 3/30*    (2006.01)
  *G01P 15/18*   (2013.01)
  *G01M 7/08*    (2006.01)

(52) U.S. Cl.
  CPC ............... *G01N 3/04* (2013.01); *G01M 7/08* (2013.01); *G01N 3/30* (2013.01); *G01P 15/18* (2013.01); *G01N 2203/026* (2013.01); *G01N 2203/0256* (2013.01); *G01N 2203/0405* (2013.01); *G01N 2203/0482* (2013.01); *G01N 2203/0676* (2013.01)

(58) Field of Classification Search
  CPC .... G01N 3/04; G01N 3/30; G01N 2203/0676; G01N 2203/0256; G01N 2203/0405; G01N 2203/0482; G01N 2203/026; G01P 15/18; G01M 7/08
  See application file for complete search history.

(56) References Cited

U.S. PATENT DOCUMENTS 4,850,231 A * 7/1989 Ralfs ................. G01N 3/04
                                              73/859

* cited by examiner

*Primary Examiner* — Jonathan M Dunlap
(74) *Attorney, Agent, or Firm* — Hovey Williams LLP

(57) ABSTRACT

An assembly for shock testing a specimen, the assembly including first and second opposing brackets and opposing lower and upper caps. The opposing brackets include lower and upper angled surfaces. The lower cap includes lower angled surfaces configured to engage the lower angled surfaces of the left and right brackets. The upper cap includes upper angled surfaces configured to engage the upper angled surfaces of the left and right brackets. The first and second brackets are configured to be drawn toward each other via fasteners, thereby wedging the lower and upper caps toward each other against the specimen.

24 Claims, 5 Drawing Sheets

SHOCK TEST ASSEMBLY

GOVERNMENT INTERESTS

This invention was made with Government support under Contract No.: DE-NA0002839 awarded by the United States Department of Energy/National Nuclear Security Administration. The Government has certain rights in the invention.

BACKGROUND

Shock test assemblies are often used for securing specimens to a shock table via a combination of plates, blocks, and/or inserts. Forces required to secure a specimen during shock tests are typically absorbed by clamping bolts, which results in high edge loading on the specimen. At extremely high levels of shock, clamping bolts may be stressed to failure. Such shock test assemblies also work only in one orientation, thus requiring six shock test assemblies to fully test a single specimen.

SUMMARY

Embodiments of the invention solve the above-mentioned problems and other problems and provide a distinct advancement in the art of shock test assemblies. More particularly, the invention provides a shock test assembly that more effectively secures a specimen.

An embodiment of the shock test assembly broadly comprises opposing first and second brackets, opposing lower and upper caps, a number of fasteners, and a number of accelerometers. The shock test assembly may be made of aluminum, titanium, or any other suitable material.

The first and second brackets are substantially similar so only the first bracket will be described in detail. The first bracket includes a base, a riser, a through-space, a lower angled surface, and an upper angled surface. The first bracket may have an L-shape, an inverted T-shape, or any other suitable shape.

The base includes a number of vertical fastener holes and a number of accelerometer mounting points. The base may be a flange, a plate, a foot, or any other suitable support structure.

The vertical fastener holes receive fasteners therethrough for mounting the first bracket to a shock table. The vertical fastener holes are slotted for allowing the first and second brackets to be drawn together.

The accelerometer mounting points may be bolt holes, screw holes, flanges, or the like. In one embodiment, the accelerometer mounting points are positioned on a top surface of the base for mounting some of the accelerometers onto the base.

The riser is an inverted U-shaped structure extending vertically from the top surface of the base. The riser frames the lower cap and upper cap via the through-space.

The through-space extends horizontally through the riser for accommodating at least a portion of the lower cap and at least a portion of the upper cap. The through-space may be bounded on its lower end by the lower angled surface and on its upper end by the upper angled surface.

The lower angled surface slopes downward from the top surface of the base to a front surface of the base at a lower end of the through-space between the left and right vertical legs. The lower angled surface may be inclined between one degree and thirty degrees. The inclination of the lower angled surface may match an inclination of an angled surface of the lower cap.

The upper angled surface slopes upward on a bottom side of the horizontally extending cross-member between the left and right vertical legs. The upper angled surface may be inclined between one and thirty degrees. The inclination of the upper angled surface may match an inclination of an angled surface of the upper cap. In one embodiment, the inclinations of the upper angled surface and lower angled surface are equal but opposite.

The lower cap includes an upper surface, a lip, and opposing first and second lower angled surfaces. The lower cap may have an inverted double wedge shape.

The upper surface is a horizontally-extending upward facing surface for supporting the specimen. To that end, the upper surface may be substantially flat or may have recesses, grooves, ridges, alignment nubs, or other geometry for accommodating various specimen shapes or features. The upper surface may be rectangular or any other suitable shape.

The lip is a raised ledge encircling a perimeter of the upper surface. The lip retains the specimen on the upper surface. The lip may have a shape matching the shape of the upper surface.

The first lower angled surface slopes upward on a bottom side of the lower cap and may be inclined between one and thirty degrees. An inclination of the first lower angled surface may match an inclination of the lower angled surface of the first bracket.

The second lower angled surface slopes upward on the bottom side of the lower cap opposite the first lower angled surface and may be inclined between one and 30 degrees. An inclination of the second lower angled surface may match an inclination of the lower angled surface of the second bracket.

The upper cap includes a lower surface, a lip, and first and second upper angled surfaces. The upper cap may have a double wedge shape. In one embodiment, the upper cap is substantially similar to the lower cap except inverted.

The lower surface is a horizontally-extending downward facing surface configured to abut a top of the specimen. To that end, the lower surface may be substantially flat or may have recesses, grooves, ridges, alignment nubs, or other geometry for accommodating various specimen shapes or features. The lower surface may be rectangular or any other suitable shape.

The lip is a lowered ledge encircling a perimeter of the lower surface. The lip retains the specimen in abutment with the lower surface. The lip may have a shape matching the shape of the lower surface.

The first upper angled surface slopes downward on a top side of the upper cap and may be inclined between one and thirty degrees. An inclination of the first upper angled surface may match an inclination of the upper angled surface of the first bracket.

The second upper angled surface slopes downward on the top side of the upper cap opposite the first upper angled surface and may be inclined between one and thirty degrees. An inclination of the second upper angled surface may match an inclination of the upper angled surface of the second bracket.

The fasteners may be bolts, rods, clamps, or the like for securing the first and second brackets together. In one embodiment, the fasteners include four bolts inserted through horizontal fastener holes of the first bracket and received in horizontal fastener holes of the second bracket.

The accelerometers detect acceleration of the shock test assembly and hence the specimen. The accelerometers may be piezoelectric accelerometers, strain gauges, capacitive accelerometers, or the like. The accelerometers may be mounted on or attached to the first and second brackets, the lower cap, and/or the upper cap.

In use, the shock test assembly can shock test an approximately 1 pound specimen to over 20,000 g acceleration in two orientations. That is, the lower cap, upper cap, and specimen (or the specimen by itself in some embodiments) can be turned upside down such that the specimen can be shock tested in an upright orientation and in an upside-down orientation. As such, three shock test assemblies can fully test a specimen in six orientations.

To test the specimen in a desired orientation, the specimen may be positioned on the upper surface of the lower cap. A lower surface of the specimen may be flush against the upper surface with the lip encircling the specimen.

The upper cap may then be positioned on the specimen opposite the lower cap. An upper surface of the specimen may be flush against the lower surface with the lip encircling the specimen.

The lower cap, specimen, and upper cap may then be at least partially inserted into the through-spaces of the left and right brackets so that the first and second brackets bookend the lower cap, specimen, and upper cap. At this point, the first lower angled surface of the lower cap may abut the lower angled surface of the first bracket. The second lower angled surface of the lower cap may abut the lower angled surface of the second bracket. The first upper angled surface of the upper cap may abut the upper angled surface of the first bracket. The second upper angled surface of the upper cap may abut the upper angled surface of the second bracket.

Bracket fasteners may then be inserted through the horizontal fastener holes of the first bracket and into the horizontal fastener holes of the second bracket. Mounting fasteners may also be inserted into the vertical fastener holes but not tightened.

The bracket fasteners may then be tightened so as to draw the first bracket and second bracket toward each other. The first and second brackets in turn impart a compressive force to the lower cap, specimen, and upper cap via the angled surfaces. This evenly distributes the compressive force between the lower cap and upper cap so that the specimen is evenly compressed. The oblong vertical fastener holes allow the first bracket and second bracket to be drawn toward each other without imparting a shearing or bending force on the mounting fasteners. The mounting fasteners may then be tightened so as to secure the shock test assembly to the shock table.

The accelerometers may then be connected, communicatively coupled, and/or linked to a data collection, processing, and analyzing computing system. For example, wires may be connected between the accelerometers and the computing system. Alternatively, the accelerometers may communicate wirelessly with the computing system.

A shock or shocks may then be applied to the shock test assembly and hence to the specimen. The accelerometers in turn transmit acceleration data to the computing system. Shocks may be applied until the desired amount of data is obtained.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1. is a perspective view of a shock test assembly constructed in accordance with an embodiment of the invention is illustrated;

Figure 1:
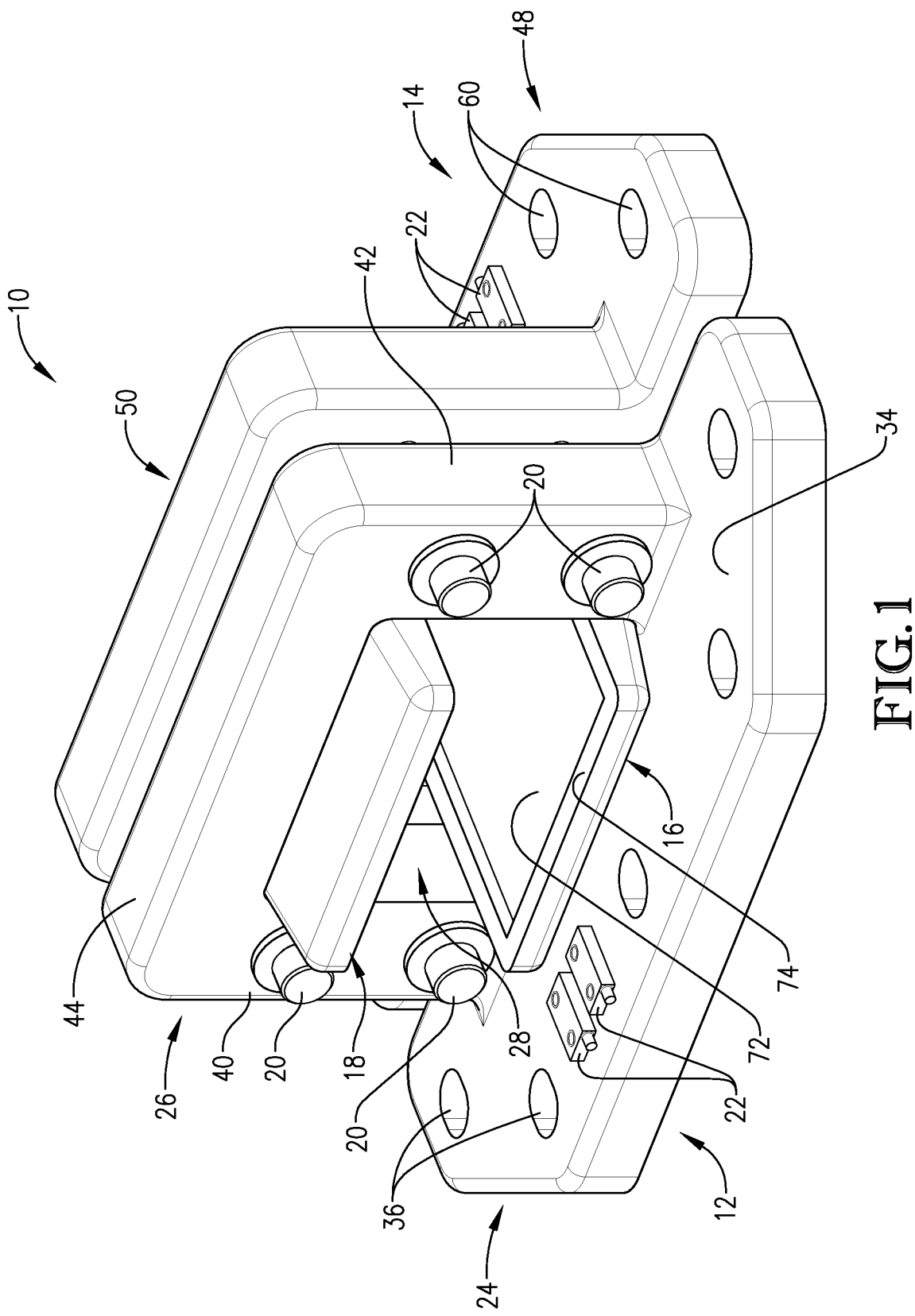
Figure 2:
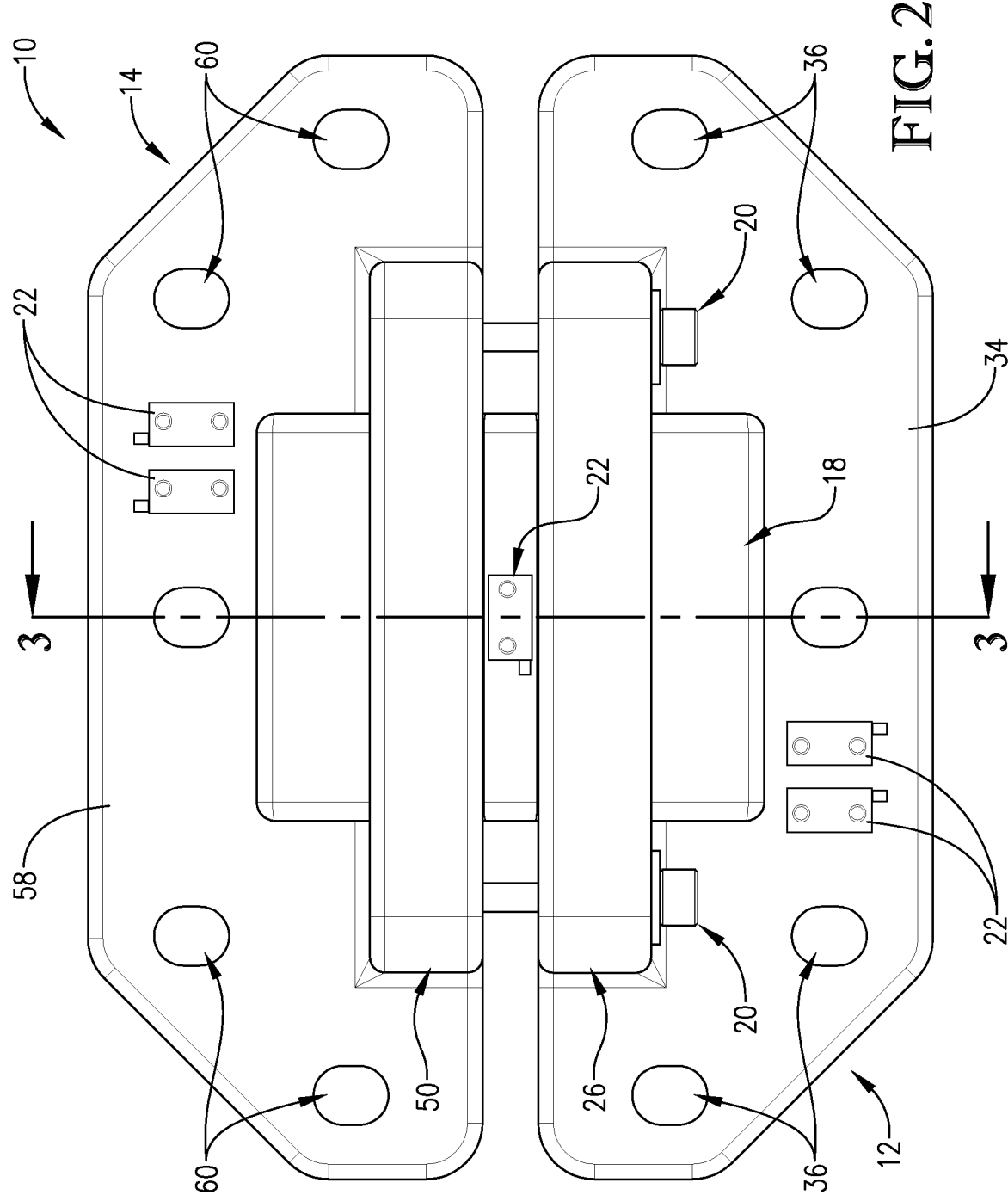
FIG. 2 is a plan view of the shock test assembly of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIGS. 1-4, an assembly 10 for shock testing a specimen 100 is illustrated. The shock test assembly 10 broadly comprises a first bracket 12, a second bracket 14, a lower cap 16, an upper cap 18, a plurality of fasteners 20, and a plurality of accelerometers 22. The shock test assembly 10 may be made of aluminum, titanium, or the like and may be machined, stamped, molded, or additively manufactured.

Figure 3:
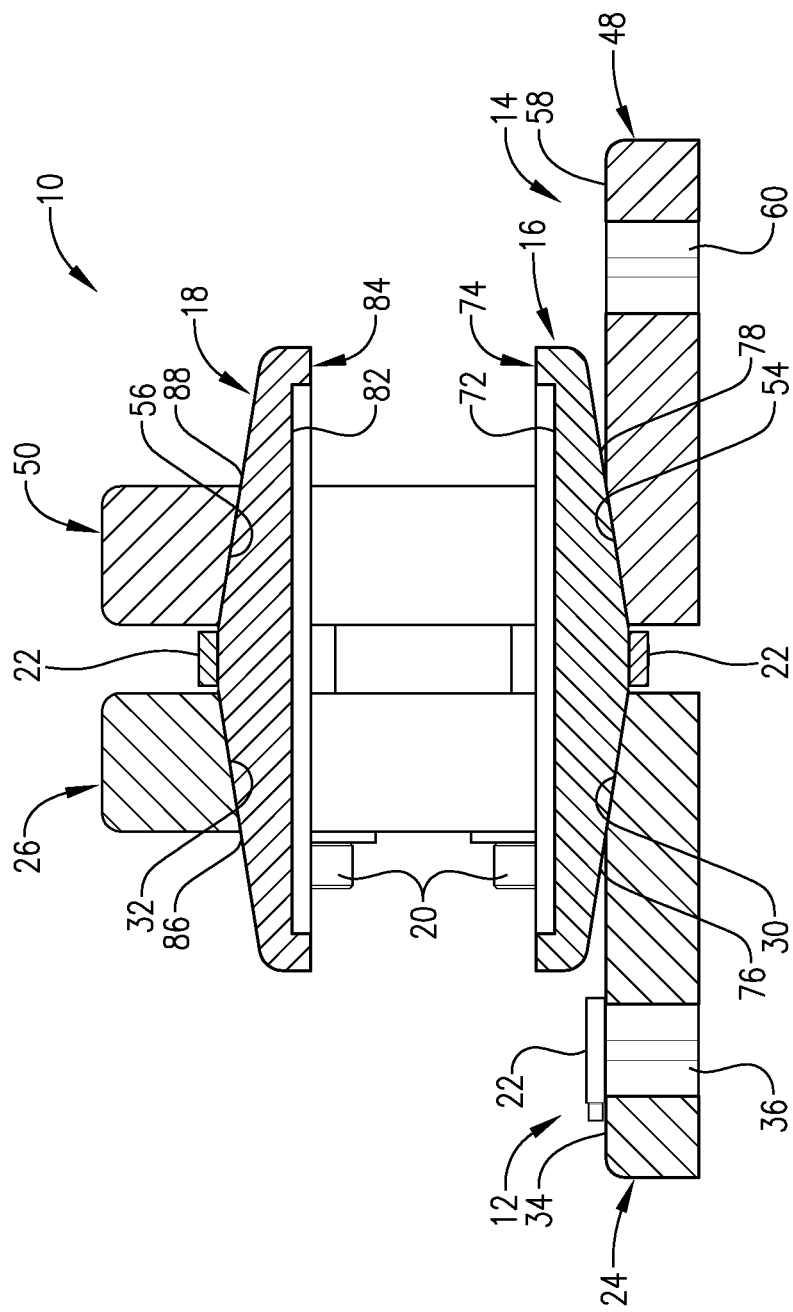
FIG. 3 is a front elevation cross section view of the shock test assembly of FIG. 1.
Figure 4:
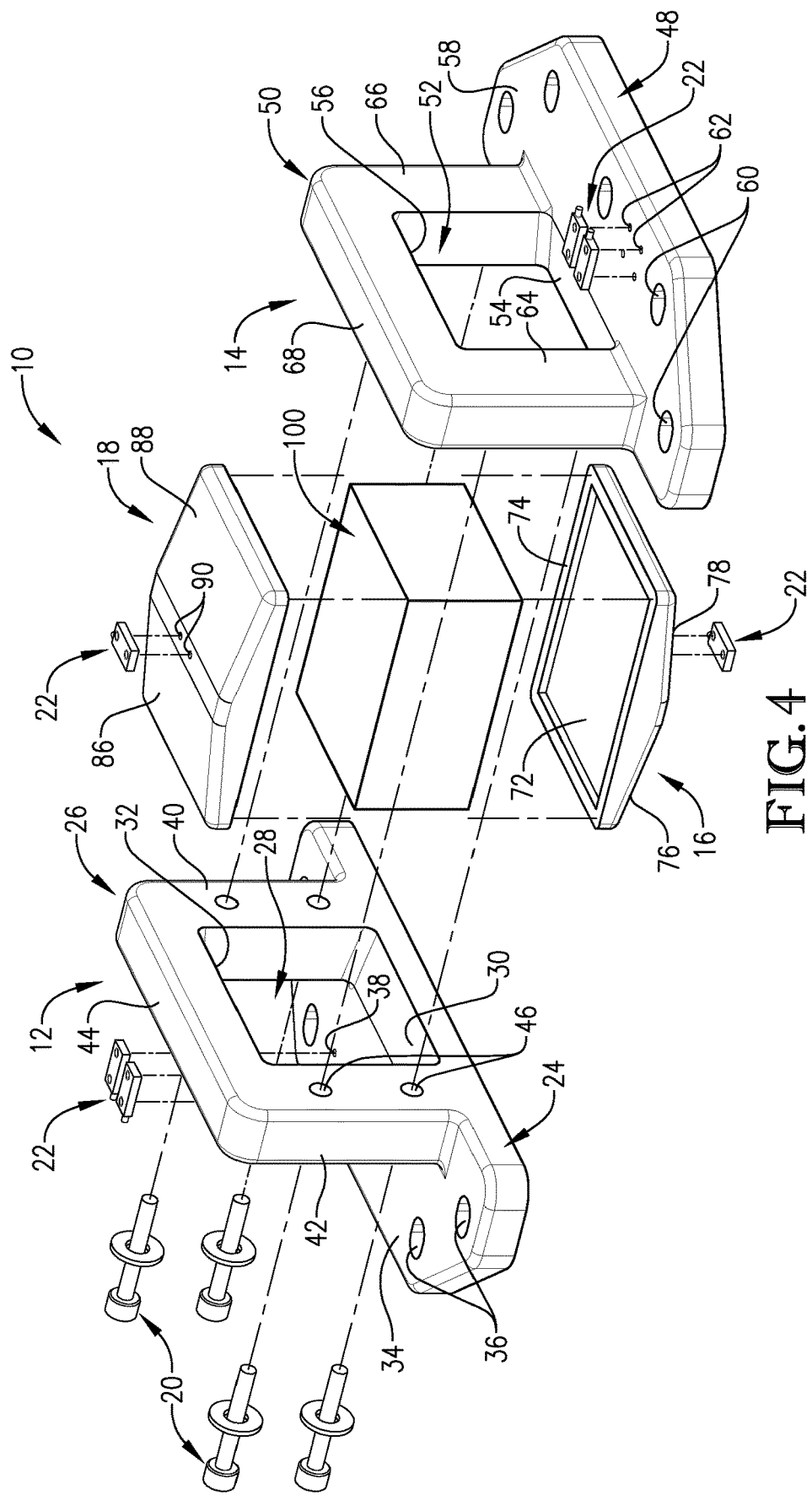
FIG. 4 is an exploded view of the shock test assembly of FIG. 1.

The first bracket 12 includes a base 24, a riser 26, a through-space 28, a lower angled surface 30, and an upper angled surface 32. The first bracket 12 may be L-shaped (as best seen in FIG. 3), inverted T-shaped, or any other suitable shape.

The base 24 may be a flange, a plate, a foot, or any other suitable support structure and includes a top surface 34, a plurality of vertical fastener holes 36, and a plurality of accelerometer mounting points 38. The base 24 supports the riser 26 on a shock table or the like.

The vertical fastener holes 36 may be oblong slots (the purpose of which will be described below) configured to receive mounting fasteners therethrough. In one embodiment, the first bracket 12 includes 5 vertical fastener holes 36 spaced from each other and laterally spaced from the riser 26 near an outer perimeter of the base 24.

The accelerometer mounting points 38 may be bolt holes, screw holes, flanges, or the like. In one embodiment, the accelerometer mounting points 38 are positioned on the top surface 34 for mounting some of the accelerometers 22 onto the base 24.

The riser 26 may include left and right vertical legs 40, 42, a horizontally extending cross-member 44, and a plurality of horizontal fastener holes 46. In one embodiment, the riser 26 is an inverted U-shaped structure extending vertically from the top surface 34 of the base 24. The riser 26 frames the lower cap 16 and upper cap 18 via the through-space 28.

The horizontal fastener holes 46 may be circular holes, oblong slots, or the like for receiving fasteners 20 therethrough. In one embodiment, the horizontal fastener holes 46 include left and right lower horizontal fastener holes and left and right upper horizontal fastener holes passing through the left and right vertical legs 40, 42. The horizontal fastener holes 46 are configured to align with horizontal fastener holes of the second bracket 14.

The through-space 28 extends horizontally through the riser 26 for accommodating at least a portion of the lower cap 16 and at least a portion of the upper cap 18. The through-space 28 may be bounded on its lower end by the lower angled surface 30 and on its upper end by the upper angled surface 32. The through-space may be substantially rectangular although other shapes may be used depending on shapes of the lower cap 16 and upper cap 18.

The lower angled surface 30 slopes downward from the top surface 34 of the base 24 to a front surface of the base 24 at a lower end of the through-space 28 between the left and right vertical legs 40, 42. The lower angled surface 30 may be inclined between one degree and thirty degrees. The inclination of the lower angled surface 30 may match an inclination of an angled surface of the lower cap 16.

The upper angled surface 32 slopes upward on a bottom side of the horizontally extending cross-member 44 between the left and right vertical legs 40, 42. The upper angled surface 32 may be inclined between one and thirty degrees. The inclination of the upper angled surface 32 may match an inclination of an angled surface of the upper cap 18. In one embodiment, the inclinations of the upper angled surface 32 and lower angled surface 30 are equal but opposite.

The second bracket 14 includes a base 48, a riser 50, a through-space 52, a lower angled surface 54, an upper angled surface 56. The second bracket 14 may be L-shaped (as best seen in FIG. 3), inverted T-shaped, or any other suitable shape.

The base 48 may be a flange, a plate, a foot, or any other suitable support structure and includes a top surface 58, a plurality of vertical fastener holes 60, and a plurality of accelerometer mounting points 62. The base 48 supports the riser 50 on a shock table or the like.

The vertical fastener holes 60 may be oblong slots (the purpose of which will be described below) configured to receive mounting fasteners therethrough. In one embodiment, the second bracket 14 includes five vertical fastener holes 60 spaced from each other and laterally spaced from the riser 50 near an outer perimeter of the base 48.

The accelerometer mounting points 62 may include bolt holes, screw holes, flanges, or the like. In one embodiment, the accelerometer mounting points 62 are positioned on the top surface 58 for mounting some of the accelerometers 22 onto the base 48.

The riser 50 may include left and right vertical legs 64, 66, a horizontally extending cross-member 68, and a plurality of horizontal fastener holes 70. In one embodiment, the riser 50 is an inverted U-shaped structure extending vertically from the top surface 58 of the base 48. The riser 50 frames the lower cap 16 and upper cap 18 via the through-space 52.

The horizontal fastener holes 70 may be circular holes, oblong slots, or the like for receiving ends of the fasteners 20. To that end, the horizontal fastener holes 70 may be threaded for securing bolts. In one embodiment, the horizontal fastener holes 70 include left and right lower horizontal fastener holes and left and right upper horizontal fastener holes extending into the left and right vertical legs 64, 66. The fastener holes 70 are configured to align with the horizontal fastener holes 70 of the first bracket 12.

The through-space 52 extends horizontally through the riser 50 for accommodating at least a portion of the lower cap 16 and at least a portion of the upper cap 18. The through-space 52 may be bounded on its lower end by the lower angled surface 54 and on its upper end by the upper angled surface 56. The through-space may be substantially rectangular although other shapes may be used depending on shapes of the lower cap 16 and upper cap 18.

The lower angled surface 54 slopes downward from the top surface 58 of the base 48 to a front surface of the base 48 at a lower end of the through-space 52 between the left and right vertical legs 64, 66. The lower angled surface 54 may be inclined between one degree and thirty degrees. The inclination of the lower angled surface 54 may match an inclination of an angled surface of the lower cap 16.

The upper angled surface 56 slopes upward on a bottom side of the horizontally extending cross-member 68 between the left and right vertical legs 64, 66. The upper angled surface 56 may be inclined between one and thirty degrees. The inclination of the upper angled surface 56 may match an inclination of an angled surface of the upper cap 18. In one embodiment, the inclinations of the upper angled surface 56 and lower angled surface 54 are equal but opposite.

The lower cap 16 includes an upper surface 72, a lip 74, opposing first and second lower angled surfaces 76, 78, and an accelerometer mounting point 80. The lower cap 16 may have an inverted double wedge shape, as best seen in FIG. 3.

The upper surface 72 is a horizontally-extending upward facing surface for supporting the specimen 100. To that end, the upper surface 72 may be substantially flat or may have recesses, grooves, ridges, alignment nubs, or other geometry for accommodating various specimen shapes or features. The upper surface 72 may be rectangular or any other suitable shape.

The lip 74 is a raised ledge encircling a perimeter of the upper surface 72. The lip 74 retains the specimen 100 on the upper surface 72. The lip 74 may have a shape matching the shape of the upper surface 72.

The first lower angled surface 76 slopes upward on a bottom side of the lower cap 16 and may be inclined between one and 30 degrees. An inclination of the first lower angled surface 76 may match an inclination of the lower angled surface 30 of the first bracket 12.

The second lower angled surface 78 slopes upward on the bottom side of the lower cap 16 opposite the first lower angled surface 76 and may be inclined between one and 30 degrees. An inclination of the second lower angled surface 78 may match an inclination of the lower angled surface 54 of the second bracket 14.

The accelerometer mounting point 80 may include bolt holes, screw holes, flanges, or the like. In one embodiment, the accelerometer mounting point 80 is positioned on a bottom side of the lower cap 16 between the first and second lower angled surfaces 76, 78 for mounting one of the accelerometers 22 onto the lower cap 16.

The upper cap 18 includes a lower surface 82, a lip 84, first and second upper angled surfaces 86, 88, and an accelerometer mounting point 90. The upper cap 18 may have a double wedge shape, as best seen in FIG. 3. In one embodiment, the upper cap 18 is substantially similar to the lower cap 16 except inverted.

The lower surface 82 is a horizontally-extending downward facing surface configured to abut a top of the specimen 100. To that end, the lower surface 82 may be substantially flat or may have recesses, grooves, ridges, alignment nubs, or other geometry for accommodating various specimen shapes or features. The lower surface 82 may be rectangular or any other suitable shape.

The lip 84 is a lowered ledge encircling a perimeter of the lower surface 82. The lip 84 retains the specimen 100 in abutment with the lower surface 82. The lip 84 may have a shape matching the shape of the lower surface 82.

The first upper angled surface 86 slopes downward on a top side of the upper cap 18 and may be inclined between one and 30 degrees. An inclination of the first upper angled surface 86 may match an inclination of the upper angled surface 32 of the first bracket 12.

The second upper angled surface 88 slopes downward on the top side of the upper cap 18 opposite the first upper angled surface 86 and may be inclined between one and 30 degrees. An inclination of the second upper angled surface 88 may match an inclination of the upper angled surface 56 of the second bracket 14.

The accelerometer mounting point 90 may include bolt holes, screw holes, flanges, or the like. In one embodiment, the accelerometer mounting point 90 is positioned on a top side of the upper cap 18 between the first and second upper angled surfaces 86, 88 for mounting one of the accelerometers 22 onto the upper cap 18.

The fasteners 20 may be bolts, rods, clamps, or the like for securing the first and second brackets 12, 14 together. In one embodiment, the fasteners 20 include four bolts inserted through the horizontal fastener holes 46 of the first bracket 12 and received in the horizontal fastener holes 70 of the second bracket 14.

The accelerometers 22 detect acceleration of the shock test assembly 10 and hence the specimen 100. The accelerometers 22 may be piezoelectric accelerometers, strain gauges, capacitive accelerometers, or the like. In one embodiment, the accelerometers are 3991A1020KG model accelerometers manufactured by PCB Piezotronics. The accelerometers may be mounted on or attached to the first and second brackets 12, 14, the lower cap 16, and the upper cap 18 via the accelerometer mounting points 38, 62, 80, 90.

Figure 5:
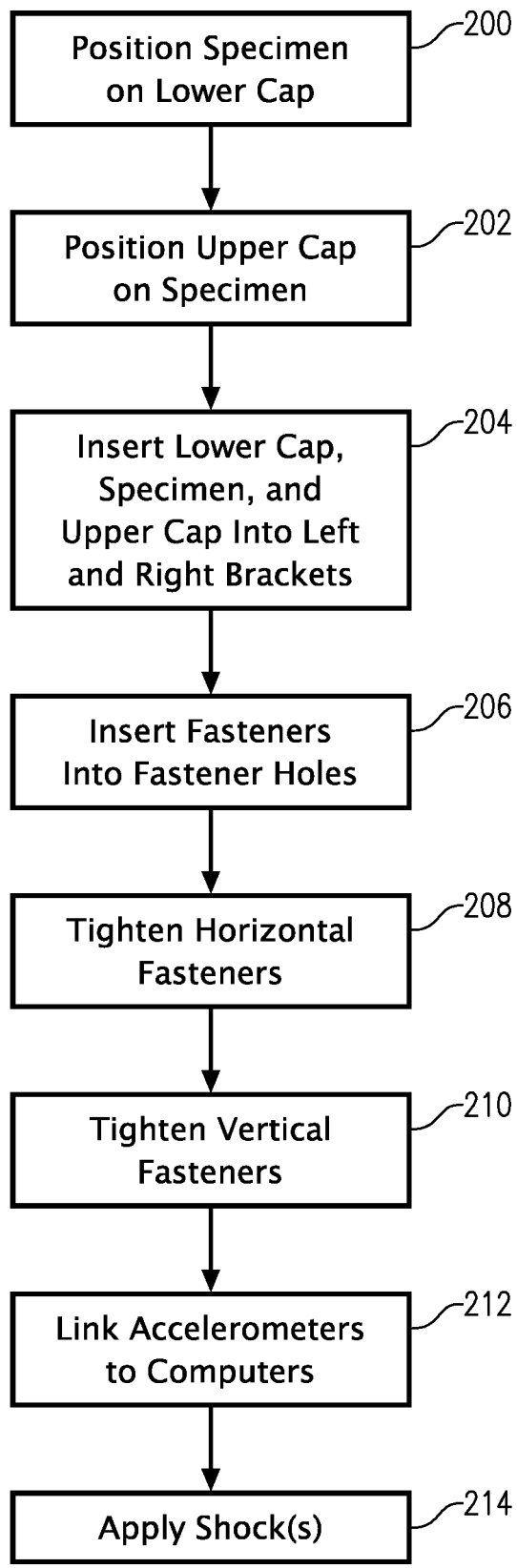
FIG. 5 is a flow diagram including some steps of a method of shock testing a specimen via the shock test assembly of FIG. 1.

Turning to FIG. 5 and with reference to FIGS. 1-4, use of the shock test assembly 10 will now be described in more detail. First, the specimen 100 may be positioned on the upper surface 72 of the lower cap 16, as shown in block 200. A lower surface of the specimen 100 may be flush against the upper surface 72 with the lip 74 encircling the specimen 100.

The upper cap 18 may then be positioned on the specimen 100 opposite the lower cap 16, as shown in block 202. An upper surface of the specimen 100 may be flush against the lower surface 82 with the lip 84 encircling the specimen 100.

The lower cap 16, specimen 100, and upper cap 18 may then be at least partially inserted into the through-spaces 28, 52 of the left and right brackets 12, 14 so that the first and second brackets 12,14 bookend the lower cap 16, specimen 100, and upper cap 18, as shown in block 204. At this point, the first lower angled surface 76 of the lower cap 16 may abut the lower angled surface 30 of the first bracket 12. The second lower angled surface 78 of the lower cap 16 may abut the lower angled surface 54 of the second bracket 14. The first upper angled surface 86 of the upper cap 18 may abut the upper angled surface 32 of the first bracket 12. The second upper angled surface 88 of the upper cap 18 may abut the upper angled surface 56 of the second bracket 14.

The fasteners 20 may then be inserted through the horizontal fastener holes 46 of the first bracket 12 and into the horizontal fastener holes 70 of the second bracket 14, as shown in block 206. Mounting fasteners may also be inserted into the vertical fastener holes 36, 60 but not tightened, the purpose of which will be described below.

The fasteners 20 may then be tightened so as to draw the first bracket 12 and second bracket 14 toward each other, as shown in block 208. The first and second brackets 12, 14 in turn impart a compressive force to the lower cap 16, specimen 100, and upper cap 18 via the angled surfaces. This evenly distributes the compressive force between the lower cap 16 and upper cap 18 so that the specimen 100 is evenly compressed. The oblong vertical fastener holes 36 allow the first bracket 12 and second bracket 14 to be drawn toward each other without imparting a shearing or bending force on the mounting fasteners. The mounting fasteners may then be tightened so as to secure the shock test assembly 10 to a shock table or other external structure, as shown in block 210.

The accelerometers 22 may then be connected, communicatively coupled, and/or linked to a data collection, processing, and analyzing computing system, as shown in block 212. For example, wires may be connected between the accelerometers 22 and the computing system. Alternatively, the accelerometers may communicate wirelessly with the computing system.

A shock or shocks may then be applied to the shock test assembly 10 and hence to the specimen 100, as shown in block 214. The accelerometers 22 in turn transmit acceleration data to the computing system. Step 214 may be repeated until the desired amount of data is obtained.

The above-described shock test assembly 10 and method provide several advantages. For example, the shock test assembly 10 can be used to test an approximately 1 pound specimen to over 20,000 g acceleration in two orientations. For example, the lower cap 16, upper cap 18, and specimen 100 (or the specimen 100 by itself in some embodiments) can be turned upside down such that the specimen 100 can be shock tested in an upright orientation and in an upside-down orientation. As such, three shock test assemblies can fully test a specimen in six orientations. The shock test assembly 10 can withstand multiple tests and test iterations and does not damage the specimen 100 before, during, or after a shock event.

The wedge shapes of the lower cap 16 and upper cap 18 and the non-parallel angle between the horizontal fasteners 20 and the direction of the compressive force provide a mechanical advantage for compression of the specimen 100. Specifically, the mechanical advantage of the wedge shapes is the ratio of the length of a wedge divided by the width of the wedge. Advantageously, the mechanical advantage can be chosen (or changed) by increasing or decreasing the slope of the wedge shapes. A shallower slope provides a greater mechanical advantage, whereas a steeper slope provides a lesser mechanical advantage but does not require a large input distance.

The mechanical advantage reduces the force acting on the horizontal fasteners 20 and hence reduces stress and stretching endured by the horizontal fasteners 20. The non-parallel angle between the horizontal fasteners 20 and the direction of the compressive force allows the shock test assembly 10 to withstand larger shocks and enables shocks to be absorbed by the left and right brackets 12, 14 rather than the horizontal fasteners 20.

The shock test assembly 10 reduces edge loading on the specimen 100, which reduces damage to the specimen 100. That is, compression is distributed evenly from the lower cap 16 and upper cap 18 to the specimen 100 instead of being concentrated near corners and edges of the specimen 100. This is due to the force of the horizontal fasteners 20 indirectly contributing to the compression via the wedge shapes of the lower cap 16 and upper cap 18. The shock test assembly 10 is lightweight and easy to use, thereby preventing operator error.

The shock test assembly 10 can accommodate specimens of different sizes and shapes. To that end, the left and right brackets 12, 14 can be drawn toward each other until the lower and upper caps 16, 18 contact the specimen. For example, the left and right brackets 12, 14 may be drawn closer together for a smaller specimen than for a taller specimen. The lower and upper caps 16, 18 can also be replaced with caps of different sizes or shapes for testing different sized specimens.

The left and right brackets 12, 14 each form a single structure that buttresses the specimen 100 between the top side of the specimen 100 and the bottom side of the specimen 100 via the vertical legs 40, 42 and cross-member 44 of the left bracket 12 and the vertical legs 64, 66 and the cross-member 68 of the right bracket 14. This improves rigidity of the shock test assembly 10 with the specimen 100. In contrast, conventional shock test assemblies do not buttress a specimen via any single component, which may compromise test results.

The shock test assembly 10 can be used without horizontal fasteners in some embodiments. To that end, the left and right brackets 12, 14 can be force-wedged together, whereby friction between the left and right brackets 12, 14 and the lower and upper caps 16, 18 (with vertical fasteners securing the shock test assembly 10 to a shock table or other external structure) keeps the shock test assembly 10 together. This can be achieved for small (i.e., shallow) wedge angles.

The shock test assembly 10 has been described with wedge shaped caps. A single wedge shape may be used to provide the mechanical advantage. Other mechanical advantage sources may be used, such as a cam, a linkage, a lever, a helical thread, a gear, a pneumatic system, a hydraulic system, a chain or belt drive, a pulley, or the like.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An assembly for shock testing a specimen having a lower side and an upper side, the assembly comprising:
    first and second opposing brackets each having upper angled surfaces, the first and second opposing brackets being configured to be positioned laterally relative to each other; and
    a wedge-shaped upper cap having:
        a lower surface configured to abut the upper side of the specimen; and
        first and second angled surfaces, the upper angled surfaces of the first and second opposing brackets being configured to engage the first and second angled surfaces of the upper cap,
    wherein the brackets impart a force on the cap when the brackets are drawn together so that the cap imparts a longitudinal compressive force on the specimen, a direction of the longitudinal compressive force and a direction of the force imparted by the brackets being non-parallel relative to each other.

2. The assembly of claim 1, wherein the cap is a wedge-shaped lower cap having an upper surface configured to abut the lower side of the specimen.

3. The assembly of claim 1, wherein the cap is a wedge-shaped upper cap having a lower surface configured to abut the upper side of the specimen, the assembly further comprising:
    a wedge-shaped lower cap having an upper surface configured to abut the lower side of the specimen.

4. The assembly of claim 3, wherein the lower cap has first and second angled surfaces, the upper cap has first and second angled surfaces, the first bracket has a lower angled surface and an upper angled surface, and the second bracket has a lower angled surface and an upper angled surface, the lower angled surfaces of the first and second brackets being configured to engage the first and second angled surfaces of the lower cap, the upper angled surfaces of the first and second brackets being configured to engage the first and second angled surfaces of the upper cap.

5. The assembly of claim 4, wherein the upper cap has a double-wedge shape and the lower cap has an upside-down double-wedge shape.

6. The assembly of claim 4, the angled surfaces being inclined between 1 degree and 30 degrees.

7. The assembly of claim 4, the first and second brackets each including a base and a riser extending vertically from the base, the base and the riser forming a through-space having lower and upper ends, the lower angled surface being at the lower end of the through-space, the upper angled surface being at the upper end of the through-space, the through-spaces being configured to be aligned with each other for receiving at least portions of the lower cap and upper cap.

8. The assembly of claim 7, each base including a plurality of vertically-extending through-holes for fastening the assembly to an external structure via bolts.

9. The assembly of claim 3, the lower cap having a lip encircling the upper surface and the upper cap having a lip encircling the lower surface, the lips being configured to retain the specimen between the lower cap and the upper cap.

10. The assembly of claim 1, further comprising fasteners configured to draw the first and second opposing brackets together in a direction non-parallel with the direction of the longitudinal compressive force.

11. The assembly of claim 10, wherein the fasteners are configured to laterally draw the first and second opposing brackets together in a direction perpendicular to the direction of the longitudinal compressive force.

12. An assembly for shock testing a specimen having a lower side and an upper side, the assembly comprising:
 first and second opposing brackets configured to be positioned laterally relative to each other, each bracket including:
  a horizontally-extending base;
  a riser extending vertically from the base, the riser and base forming a through-space having an upper end and a lower end;
  a lower angled surface at the lower end of the through-space; and
  an upper angled surface at the upper end of the through-space;
 a wedge-shaped lower cap including:
  an upper surface configured to abut the lower side of the specimen; and
  lower angled surfaces configured to engage the lower angled surfaces of the first bracket and second bracket; and
 a wedge-shaped upper cap including:
  a lower surface configured to abut the upper side of the specimen; and
  upper angled surfaces configured to engage the upper angled surfaces of the first bracket and second bracket,
 wherein the brackets impart a force on the lower cap and upper cap when the brackets are drawn together so that the lower cap and upper cap impart a longitudinal compressive force on the specimen, a direction of the longitudinal compressive force and a direction of the force imparted by the brackets being non-parallel relative to each other.

13. The assembly of claim 12, the first and second opposing brackets including fastener holes, the assembly further comprising fasteners configured to be inserted into the fastener holes to laterally draw the first and second opposing brackets together.

14. The assembly of claim 12, the first and second brackets being identically shaped, the lower cap and the upper cap being symmetrical about a vertically extending plane.

15. The assembly of claim 12, the angled surfaces being inclined between 1 degree and 30 degrees.

16. The assembly of claim 12, each base including a plurality of vertically-extending through-holes for fastening the assembly to an external structure via bolts.

17. The assembly of claim 12, the lower cap having a lip encircling the upper surface and the upper cap having a lip encircling the lower surface, the lips being configured to retain the specimen between the lower cap and the upper cap.

18. An assembly for shock testing a specimen having a lower side and an upper side, the assembly comprising:
 first and second opposing L-shaped brackets configured to be positioned laterally relative to each other, each bracket including:
  a horizontally-extending base including a plurality of vertically-extending through-holes for fastening the assembly to an external structure;
  a riser extending vertically from the base, the riser including a plurality of horizontally-extending fastener holes, the riser and base forming a through-space having an upper end and a lower end;
  a lower angled surface at the lower end of the through-space; and
  an upper angled surface at the upper end of the through-space;
 a lower cap including:
  an upper surface configured to abut the lower side of the specimen;
  a lip encircling the upper surface for retaining the lower side of the specimen in engagement with the upper surface; and
  lower angled surfaces configured to engage the lower angled surfaces of the first bracket and second bracket;
 an upper cap including:
  a lower surface configured to abut the upper side of the specimen;
  a lip encircling the lower surface for retaining the upper side of the specimen in engagement with the lower surface; and
  upper angled surfaces configured to engage the upper angled surfaces of the first bracket and second bracket,
 wherein the through-spaces of the brackets are configured to receive at least portions of the lower cap, upper cap, and specimen, the angled surfaces being inclined between 1 degree and 30 degrees; and
 a plurality of bolts configured to be inserted into the horizontally-extending fastener holes,
 wherein the brackets impart forces on the lower cap and upper cap when the brackets are drawn together so that the lower cap and upper cap impart a longitudinal compressive force on the specimen, a direction of the longitudinal compressive force and a direction of the force imparted by the brackets being non-parallel relative to each other.

19. An assembly for shock testing a specimen having a lower side and an upper side, the assembly comprising:
 first and second opposing brackets configured to be positioned laterally relative to each other, the first and second opposing brackets each having a lower angled surface and an upper angled surface;
 a wedge-shaped upper cap having a lower surface configured to abut the upper side of the specimen and first and second angled surfaces; and
 a wedge-shaped lower cap having an upper surface configured to abut the lower side of the specimen and first and second angled surfaces,
 the lower angled surfaces of the first and second brackets being configured to engage the first and second angled surfaces of the lower cap, and
 the upper angled surfaces of the first and second brackets being configured to engage the first and second angled surfaces of the upper cap,
 wherein the first and second brackets are configured to impart a force on the upper cap and the lower cap when the first and second brackets are drawn together so that the upper cap and the lower cap impart a longitudinal compressive force on the specimen, a direction of the longitudinal compressive force and a direction of the force imparted by the brackets being non-parallel relative to each other.

20. The assembly of claim 19, wherein the upper cap has a double-wedge shape and the lower cap has an upside-down double-wedge shape.

21. The assembly of claim 19, wherein the lower angled surfaces and upper angled of the first and second opposing brackets and the first and second angled surfaces of the upper cap and lower cap are inclined between 1 degree and 30 degrees.

22. The assembly of claim 19, wherein the first and second brackets each include a base and a riser extending vertically from the base, the base and the riser forming a through-space having lower and upper ends, the lower angled surface being at the lower end of the through-space, the through-spaces of the first and second brackets being configured to be aligned with each other for receiving at least portions of the lower cap and upper cap.

23. The assembly of claim 19, each base including a plurality of vertically-extending through-holes for fastening the assembly to an external structure via bolts.

24. The assembly of claim 19, the lower cap having a lip encircling the upper surface of the lower cap, the upper cap having a lip encircling the lower surface of the upper cap, the lips being configured to retain the specimen between the lower cap and the upper cap.

\* \* \* \* \*